United States Patent
Wang et al.

(10) Patent No.: US 11,966,738 B2
(45) Date of Patent: Apr. 23, 2024

(54) PROCESSOR AND METHOD FOR FLUSHING TRANSLATION LOOKASIDE BUFFER ACCORDING TO DESIGNATED KEY IDENTIFICATION CODE

(71) Applicant: Shanghai Zhaoxin Semiconductor Co., Ltd., Shanghai (CN)

(72) Inventors: Weilin Wang, Beijing (CN); Yingbing Guan, Shanghai (CN); Yue Qin, Shanghai (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 18/046,634

(22) Filed: Oct. 14, 2022

(65) Prior Publication Data

US 2023/0161588 A1   May 25, 2023

(30) Foreign Application Priority Data

Nov. 19, 2021   (CN) .......................... 202111375304.2

(51) Int. Cl.
*G06F 9/30* (2018.01)
(52) U.S. Cl.
CPC ...... *G06F 9/30047* (2013.01); *G06F 9/30043* (2013.01); *G06F 9/30145* (2013.01)
(58) Field of Classification Search
None
See application file for complete search history.

(56) References Cited

U.S. PATENT DOCUMENTS

| | | | |
|---|---|---|---|
| 10,977,192 B1* | 4/2021 | Habusha | G06F 12/1027 |
| 2002/0069328 A1 | 6/2002 | Chauvel | |
| 2005/0027964 A1* | 2/2005 | Sperber | G06F 9/3017 712/E9.03 |
| 2011/0238947 A1* | 9/2011 | Nishiguchi | G06F 12/1036 711/207 |
| 2013/0339657 A1* | 12/2013 | Greiner | G06F 9/30043 711/207 |
| 2014/0181388 A1* | 6/2014 | Mohandru | G06F 12/0804 711/135 |
| 2015/0242319 A1 | 8/2015 | Evans | |
| 2017/0262369 A1 | 9/2017 | Murphy | |

(Continued)

OTHER PUBLICATIONS

Notice of Allowance dated Jan. 11, 2024, issued in U.S. Appl. No. 18/046,618.

(Continued)

*Primary Examiner* — Eric Coleman
(74) *Attorney, Agent, or Firm* — McClure, Qualey & Rodack, LLP (57) ABSTRACT

A technology for flushing a translation lookaside buffer (TLB) according to a designated key identification code (designated key ID). An instruction of an instruction set architecture is proposed to flush the TLB according to the designated key ID. A decoder transforms the instruction into at least one microinstruction. According to a flushing microinstruction included in the at least one microinstruction, a designated key ID is supplied to a control logic circuit of the TLB through a memory order buffer, so that the control logic circuit flushes matched entries in the TLB, wherein the matched entries match the designated key ID.

27 Claims, 10 Drawing Sheets

(56) References Cited

U.S. PATENT DOCUMENTS

| | | | |
|---|---|---|---|
| 2018/0329829 A1* | 11/2018 | Zmudzinski | G06F 12/1027 |
| 2020/0057664 A1* | 2/2020 | Durham | G06F 21/53 |
| 2020/0202012 A1 | 6/2020 | Shanbhogue | |
| 2020/0409844 A1 | 12/2020 | Sanjeepan | |
| 2021/0406195 A1 | 12/2021 | Vakharwala | |
| 2022/0066947 A1 | 3/2022 | Pape | |
| 2023/0161704 A1 | 5/2023 | Wang | |

OTHER PUBLICATIONS

Cloutier, F.; "INVD—Invalidate Internal Caches," Mar. 2023; pp. 1-2 https://web.archive.org/web/20190812221944/https://www.felixcloutier.com/x86/invd.

* cited by examiner

PROCESSOR AND METHOD FOR FLUSHING TRANSLATION LOOKASIDE BUFFER ACCORDING TO DESIGNATED KEY IDENTIFICATION CODE

CROSS REFERENCE TO RELATED APPLICATIONS

This application claims priority of China Patent Application No. 202111375304.2, filed on Nov. 19, 2021, the entirety of which is incorporated by reference herein.

BACKGROUND

Technical Field

The present application relates to management for a translation lookaside buffer (abbreviated as TLB) of a processor.

Description of the Related Art

A translation lookaside buffer (TLB), also known as a page table cache or a transfer bypass cache, is a kind of cache in a central processing unit that speeds up access to the system memory, and improves the conversion speed from a virtual address (VA) to a physical address (PA) for accessing system memory. Each entry in the translation lookaside buffer (TLB) stores mapping data that maps a virtual address (VA) to a physical address (PA). Generally, the virtual address (VA) is used as an input to search the translation lookaside buffer (TLB), and the search result is the mapped physical address (PA). If the mapping data for the input virtual address (VA) exists in the translation lookaside buffer (TLB), the mapped physical address (PA) is read from the translation lookaside buffer (TLB) and used to access the system memory. This improves the access speed to the system memory. If the mapping data for the input virtual address (VA) does not exist in the translation lookaside buffer (TLB), system resources need to be spent in a table walk (a process that involves searching the multi-level page tables that are stored in the system memory and/or the associated cache structure), which can be time-consuming.

The concept of translation lookaside buffer (TLB) may be used in various types of system memory accessing technologies, such as an instruction translation lookaside buffer (ITLB) or a data translation lookaside buffer (DTLB).

In order to protect confidential and/or sensitive data, a total memory encryption function is used in the prior art, using multiple keys to encrypt system memory. Based on the total memory encryption, the different memory spaces protected by the different keys are managed separately. However, the translation lookaside buffer (TLB) is still not managed in the granularity of keys (not managed according to the keys). The operating System (OS) is incapable of managing the translation lookaside buffer (TLB) in the granularity of keys, and therefore it is also incapable of flushing the translation lookaside buffer (TLB) based on designated keys.

BRIEF SUMMARY

In order to solve the above problem, this case proposes a technology for managing the translation lookaside buffer (TLB) in the granularity of keys.

A processor in accordance with an exemplary embodiment of the present application includes a memory order buffer (MOB), a translation lookaside buffer (TLB), and a decoder. The memory order buffer (MOB) is configured as a communication interface between the processor and a system memory. The translation lookaside buffer (TLB) has a plurality of entries cached therein, which are searched by the processor to access the system memory. In response to an instruction that is in an instruction set architecture (ISA) and provided to flush (e.g., clear) the translation lookaside buffer (TLB) based on a designated key identification code (designated key ID), the decoder decodes the instruction to provide at least one microinstruction. There may be a flushing microinstruction included in the at least one microinstruction. By executing the flushing microinstruction, the designated key ID is provided to a control logic circuit of the translation lookaside buffer (TLB) through the memory order buffer (MOB). The control logic circuit flushes matched entries in the translation lookaside buffer (TLB), wherein the matched entries match the designated key ID.

A method for flushing a translation lookaside buffer (TLB) based on a designated key ID is shown in an exemplary embodiment of the present application, which includes the following actions. In response to an instruction that is in an instruction set architecture (ISA) and provided to flush the translation lookaside buffer (TLB) based on the designated key ID, the instruction is decoded to provide at least one microinstruction. There may be a flushing microinstruction included in the at least one microinstruction. By executing the flushing microinstruction, the designated key ID is provided to a control logic circuit of the translation lookaside buffer (TLB) through a memory order buffer (MOB), to operate the control logic circuit to flush matched entries in the translation lookaside buffer (TLB), wherein the matched entries match the designated key ID.

A detailed description is given in the following embodiments with reference to the accompanying drawings.

BRIEF DESCRIPTION OF THE DRAWINGS

The present application can be more fully understood by reading the subsequent detailed description and examples with references made to the accompanying drawings, wherein.

DETAILED DESCRIPTION

The following description is made for the purpose of illustrating the general principles of the invention and should not be taken in a limiting sense. The scope of the invention is best determined by reference to the appended claims.

Nowadays, computer technology often has a virtual machine (VM) design. Multiple virtual machines may be established on a single physical machine. Each virtual machine includes at least one virtual processor (VP), and has its own operating system (OS) and applications. The different virtual machines are separated from each other and do not interfere with each other. Each virtual machine has a corresponding system memory space for use. In an exemplary embodiment, when a total memory encryption function is enabled, the different system memory spaces assigned to (or read/write by) the different virtual processors of a virtual machine are protected by the different keys. The security among the virtual processors is improved. Each key may be represented by a key identification code (key ID). A computer system may include a key table that lists the relationship between the keys and the key IDs. During encryption, the key corresponding to each key ID may be obtained by querying the key table. In another exemplary embodiment, the different system memory spaces are separately encrypted to correspond to the different threads (corresponding to the different services or applications operated by the operating system) running on a single virtual processor, and thereby the security of the different threads run by the same virtual processor is improved. In an example, a virtual machine VM0 includes a virtual processor with a virtual processor identifier (VPID) VP0, and the virtual processor VP0 runs two threads with process context identifiers P0 and P1. The thread P0 may be protected by key 1 (with a key ID KeyID0), and the thread P1 may be protected by key 2 (with a key ID KeyID1). The security between the threads P0 and P1 run by the virtual processor VP0 is improved by the two different keys KeyID0 and KeyID1.

Based on the full memory encryption of the system memory (using the different keys to encrypt the different system memory spaces), the translation lookaside buffer (TLB) of the processor is managed according to the key IDs in the present application. Specifically, the translation lookaside buffer (TLB) may be flushed (e.g., cleared) according a designated key ID (Key_ID_S), which is different from the other flushing techniques for the translation lookaside buffer (TLB). The other flushing techniques may be: flush the whole entire translation lookaside buffer (TLB); or, flush the translation lookaside buffer (TLB) according to a process context identifier (PCID, for identification of a thread), a virtual processor identifier (VPID, for identification of a virtual processor), or an extended page table pointer (EPTP). In the proposed solution, if the total memory encryption function is enabled, the translation lookaside buffer (TLB) is managed in granularity of key IDs. Only the TLB entries that match a designated key ID are flushed. The TLB entries irrelevant to the designated key ID are not flushed.

In an exemplary embodiment, a processor that manages a translation lookaside buffer (TLB) in granularity of key IDs is proposed, wherein an instruction set architecture (ISA) instruction INVL_KEYID is required. The instruction INVL_KEYID has an operand that indicates a designated key ID Key_ID_S. By executing the instruction INVL_KEYID, the translation lookaside buffer (TLB) is flushed based on the designated key ID Key_ID_S. The instruction set architecture (ISA) supported by the processor is not limited, it may be an x86 ISA, an advanced RISC machine (abbreviated as ARM) ISA, a microprocessor without interlocked pipeline stages (abbreviated as MIPS) ISA, a RISC-V ISA, a scalable processor architecture (abbreviated as SPARC) ISA, an IBM power ISA, or the others.

Figure 1A:
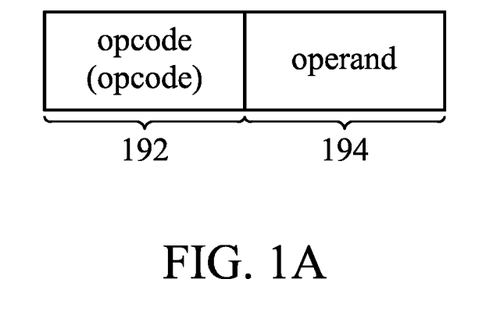
FIG. 1A shows an instruction structure of the instruction INVL_KEYID in accordance with an exemplary embodiment of the present application.

FIG. 1A shows an instruction structure of the instruction INVL_KEYID in accordance with an exemplary embodiment of the present application. In addition to an opcode 192 for recognizing the instruction INVL_KEYID, the instruction INVL_KEYID includes an operand 194 that indicates a single designated key ID (Key_ID_S). The operand 194 may have various implementations. The operand 194 may carry a register number (reg), for obtaining the designated key ID (Key_ID_S) from a register. The operand 194 may carry either a register number or a system memory address (r/m), for obtaining the designated key ID (Key_ID_S) from a register or the system memory. The operand 194 may carry an immediate value (imm16), which is interpreted as the designated key ID (Key_ID_S). In programming, some instructions may be programmed prior to the instruction INVL_KEYID to prepare the designated key ID (Key_ID_S) in the register/system memory. In another exemplary embodiment, the designated key ID (Key_ID_S) is coded as an immediate value carried in the operand 194 of the instruction INVL_KEYID.

In an exemplary embodiment, the microcode (UCODE) of the processor includes some design for executing the instruction INVL_KEYID, and hardware of the processor may be modified accordingly.

Figure 1B:
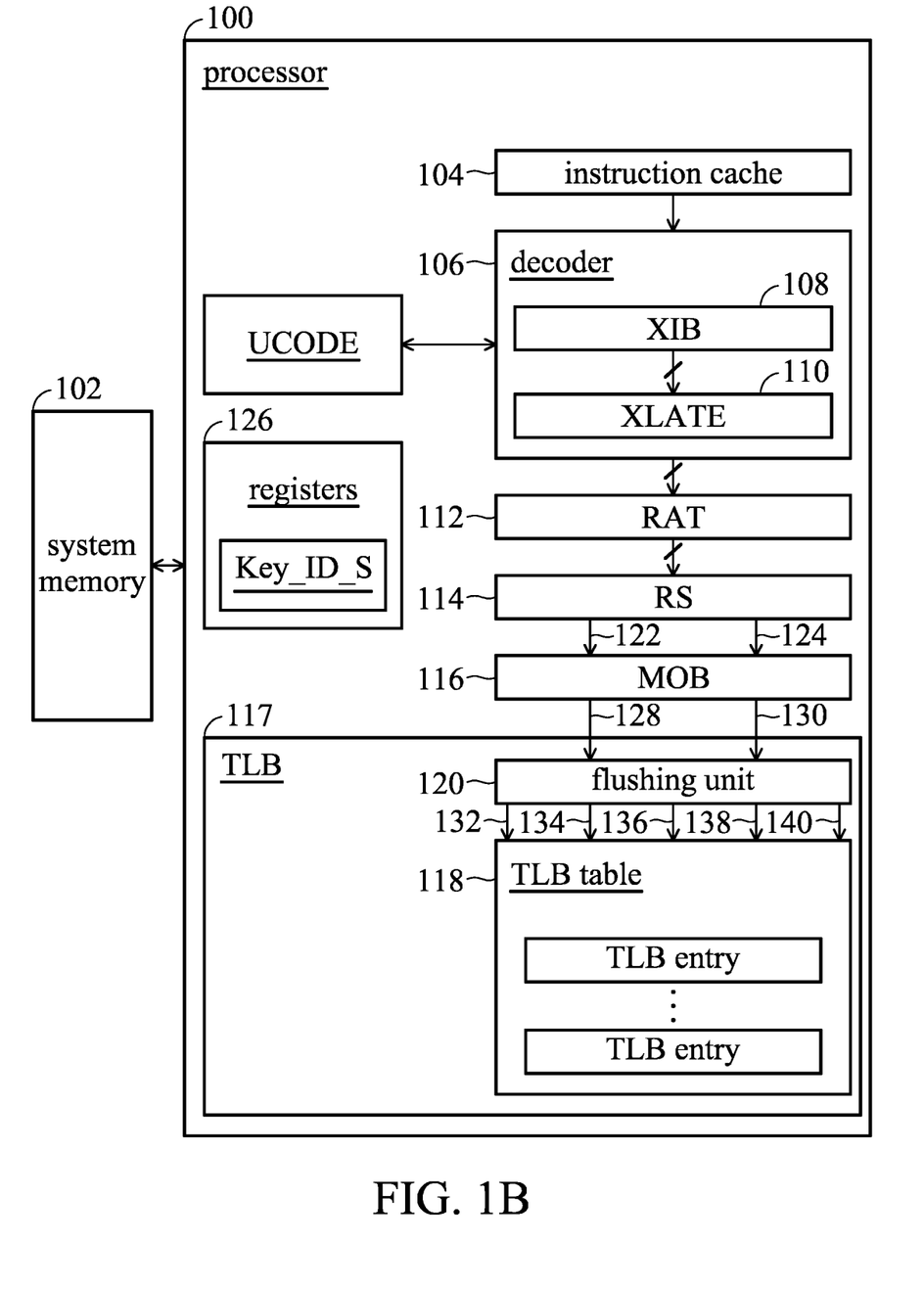
FIG. 1B is a block diagram illustrating a processor 100 in accordance with an exemplary embodiment of the present application.

FIG. 1B is a block diagram illustrating a processor 100 in accordance with an exemplary embodiment of the present application. As shown, a system memory 102 is coupled to the processor 100. A batch of instructions is loaded into an instruction cache 104 from the system memory 102 to be decoded by a decoder 106. The decoder 106 includes an instruction buffer (XIB for short) 108 and an instruction translator (XLATE for short) 110. The XIB 108 recognizes the instruction INVL_KEYID, and the XLATE 110 translates the instruction INVL_KEYID into at least one microinstruction that may be recognized by the pipeline hardware. Accordingly, the hardware is driven to flush the translation lookaside buffer (TLB) 117 according to the designated key ID (Key_ID_S). In an exemplary embodiment, the XLATE 110 translates the instruction INVL_KEYID into the at least one microinstruction based on a microcode (UCODE, stored in a microcode memory). The at least one microinstruction is stored in its corresponding reservation station (RS) 114 as indicated by information obtained from a register alias table (RAT) 112, waiting to be executed. One of the at least one microinstruction is a flushing microinstruction, which triggers a memory order buffer (MOB for short) 116 and, accordingly, drives the translation lookaside buffer (TLB) 117 to flush the TLB entries matching the designated keyID (Key_ID_S). In an exemplary embodiment, microinstructions for functions such as exception checking (e.g., privilege level checking), memory address jumping (i.e., jumping to an instruction following the instruction INVL_KEYID) are also decoded from the instruction INVL_KEYID.

The memory order buffer (MOB) 116 is generally used as a communication interface between the processor 100 and the system memory 102, which involves looking up of the translation lookaside buffer (TLB) 117 to convert a virtual address (VA) into a physical address (PA). The translation lookaside buffer table (TLB table) 118 stored in the translation lookaside buffer (TLB) 117 contains multiple TLB entries, and each TLB entry shows the mapping between one virtual address (VA) and one physical address (PA). However, the TLB table 118 is limited in size. When the space is insufficient, some TLB entries need to be flushed. In another example, when a system memory space protected by a designated key ID is flushed, the related TLB entries in the TLB table 118 should be flushed correspondingly. A flushing technology is proposed in the present application. FIG. 1B illustrates that according to the micro code design of the present application a flushing unit 120 operates to flush the TLB table 118 according to the designated key ID (Key_ID_S).

As shown in FIG. 1B, through a reservation station (RS) 114, the opcode 122 and the operands 124 of the flushing microinstruction decoded from the instruction INVL_KEYID are provided to the MOB 116. According to the recognized value of the opcode 122, the designated key ID (Key_ID_S) is acquired as indicated by the operand 124. In an exemplary embodiment, the designated key ID (Key_ID_S) is stored in a register 126 that is indicated by the operand 124. In another exemplary embodiment, the designated key ID (Key_ID_S) is stored in the system memory 102 as indicated by the operand 124. In another exemplary embodiment, the designated key ID (Key_ID_S) is an immediate value interpreted from the operand 124. Through the MOB 116, a flushing request 128 and the designated key ID (Key_ID_S) 130 is supplied to the flushing unit 120 of the translation lookaside buffer 117. According to the flushing request 128, the flushing unit 120 outputs a flushing command 132 and the designated key ID (Key_ID_S) 134 to flush the TLB entries (in the TLB table 118) matching the designated key ID (Key_ID_S) 134.

How to check the designated key ID (Key_ID_S) 134 is further discussed in the following paragraphs.

Figure 2A:
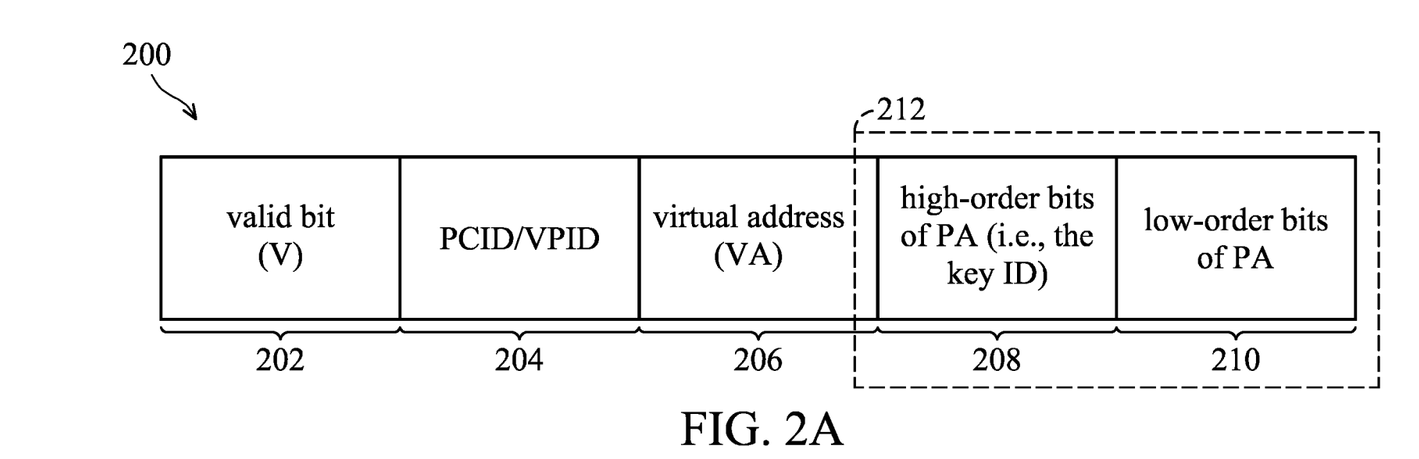
FIGS. 2A to 2D illustrate the TLB entry structure in accordance with various exemplary embodiments of the present application.
Figure 2B:
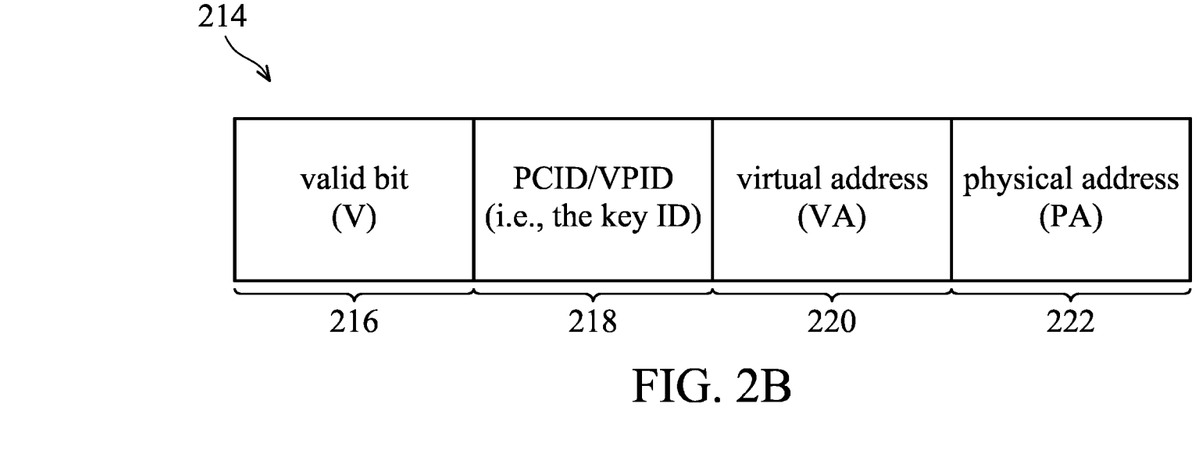
Figure 2C:
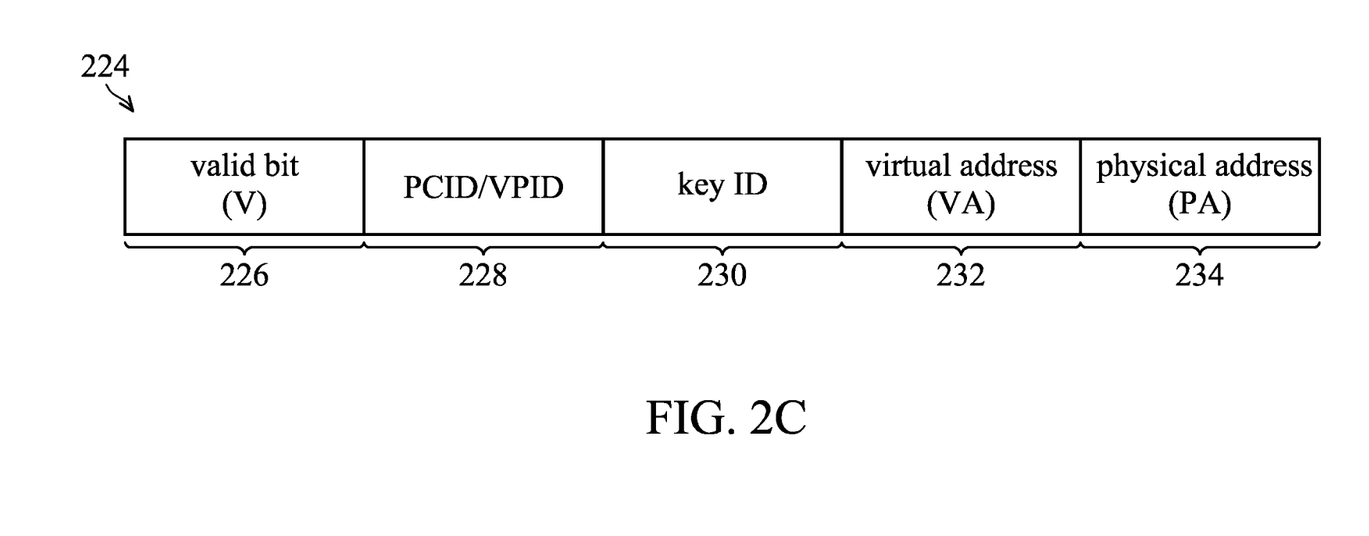

In an exemplary embodiment, the most-significant bits of a physical address (PA) are used to set a designated key ID (Key_ID_S) 134 to check the TLB table 118 for the matched entries, and the related TLB structure is shown in FIG. 2A. In another exemplary embodiment, a process context identifier PCID and/or a virtual processor identifier VPID are used to set a designated key ID (Key_ID_S) 134 to check the TLB table 118 for the matched entries, and the related TLB structure is shown in FIG. 2B. In another exemplary embodiment, the key IDs are defined independently from the physical address or any identifiers, and the related TLB structures are shown in FIG. 2C. A designated key ID (Key_ID_S) set independently from the physical address and any identifiers is applied to check the TLB table for the matched TLB entries. Another TLB structure is presented in FIG. 2D. Instead of using a designated key ID (Key_ID_S), a representative code (e.g., a code with the shorter bit length, or a one-hot code, which will be described in detail later) representing the designated key ID (Key_ID_S) is used to check the TLB entries in a more efficient manner. The matched TLC entries determined based on a representative code require less logic gates. A designated representative code 140 corresponding to the designated key ID (Key_ID_S) 134 is used to check the TLB table 118 for the matched TLB entries. In some exemplary embodiments, the extension of the virtual machine also affects the determination of the matched TLB entries. Not only the designated key ID (Key_ID_S) 134, a process context identifier (PCID) 136 and a virtual processor identifier (VPID) 138 may also be considered in checking the TLB table 118 for the matched TLB entries. The flushed TLB entries may need to match the designated key ID (Key_ID_S) 134, the PCID 136, as well as the VPID 138.

The designated key ID (Key_ID_S) 134 or the designated representative code 140 that the flushing unit 120 provides to check the TLB table 118 may be regarded as designated matching information. The matched TLB entries in the TLB table 118 are determined according to the designated matching information, and then are flushed. The designated representative code 140 is obtained based on the designated key ID (Key_ID_S) 134.

In order to realize the technology of the present application, the structure of each TLB entry needs some special designs. For example, each TLB entry needs to contain matching information for checking the key ID. The key ID matching information may have various forms.

FIGS. 2A to 2D illustrate the TLB entry structure in accordance with various exemplary embodiments of the present application.

FIG. 2A illustrates a TLB entry structure 200, including: a valid bit (V) 202 for identifying whether the TLB entry is valid (e.g., '0' means that the TLB entry is invalid, and '1' means that the TLB entry is valid); a field 204, storing a process context identifier PCID and/or a virtual processor identifier VPID; a field 206, storing a virtual address (VA); and a field 212, storing a physical address (PA) which includes high-order bits 208 and low-order bits 210. In another exemplary embodiment, the process context identifier PCID and the virtual processor identifier VPID in a TLB entry structure each occupy one field. The high-order bits 208 of the physical address (PA) may be interpreted as a key ID of the related system memory space. The high-order bits 208 of the physical address (PA) recorded in a TLB entry structure 200 may be compared with the designated key ID (Key_ID_S) 134 to determine whether the TLB entry matches the designated key ID (Key_ID_S) 134. An example is shown here. In a virtual machine VM0, a virtual processor with a VPID value VP0 executes a process whose PCID value is P0, and the process P0 uses a system memory space with a virtual address VA0. The virtual address VA0 is mapped to a physical address that is combined from a high-bit part PAH0 and a low-bit part PAL0. Referring to table 1, a related TLB entry is shown. The valid bit 202 is '1', the field 204 (PCID/VPID) is P0/VP0, the field 206 (virtual address) is VA0, the field 208 (high-order bits of PA, which is used as a key ID) is PAH0, and the field 210 (low-order bits of PA) is PAL0. The designated key ID (Key_ID_S) 134 is compared with the high-order bits PAH0 recorded in the field 208. If they are the same, the TLB entry matches the designated key ID (Key_ID_S) 134. Otherwise, it does not match.

TABLE 1

| Valid bit 202 | PCID/VPID 204 | VA 206 | High-bit part of PA 208 | Low-bit part of PA 210 |
|---|---|---|---|---|
| 1 | P0/VP0 | VA0 | PAH0 | PAL0 |

FIG. 2B illustrates a TLB entry structure 214, including: a valid bit (V) 216 for identifying whether the TLB entry is valid (e.g., '0' means that the TLB entry is invalid, and '1' means that the TLB entry is valid); a field 218, storing a process context identifier PCID and/or a virtual processor identifier VPID; a field 220, storing a virtual address (VA); and a field 222, storing a physical address (PA). In another exemplary embodiment, the process context identifier PCID and the virtual processor identifier VPID in a TLB entry structure each occupy one field. For a TLB entry, the process context identifier PCID and/or the virtual processor identifier VPID recorded in the TLB entry structure may be used as the key ID corresponding to the physical address recorded in the field 222. The flushing unit 120 may use the PCID 136 and/or the VPID 138 as a designated matching information to flush the TLB table 118. When the process context identifier PCID and/or the virtual processor identifier VPID recorded in the field 218 of a TLB entry is the same as the PCID 136 and/or the VPID 138, it means that the TLB entry matches the designated key ID (Key_ID_S) 134. An example is shown here. In a virtual machine VM0, a virtual processor with a VPID value VP0 executes a process whose PCID value is P0. The process P0 may use a system memory space with a virtual address VA0, and the virtual address VA0 is mapped to a physical address PA0. Referring to table 2, a related TLB entry is shown. The valid bit 216 is '1', the field 218 (PCID/VPID) is P0/VP0, the field 220 (virtual address) is VA0, the field 222 (physical address) is PA0. The designated key ID (Key_ID_S) 134 is compared with the VP0 and/or P0 recorded in the field 218. If they are the same, the TLB entry matches the designated key ID (Key_ID_S) 134. Otherwise, it does not match.

TABLE 2

| Valid bit 216 | PCID/VPID 218 | VA 220 | PA 222 |
|---|---|---|---|
| 1 | P0/VP0 | VA0 | PA0 |

FIG. 2C illustrates a TLB entry structure 224, including: a valid bit (V) 226 for identifying whether the TLB entry is valid (e.g., '0' means that the TLB entry is invalid, and '1' means that the TLB entry is valid); a field 228, storing a process context identifier PCID and/or a virtual processor identifier VPID; a field 230, storing a key ID; a field 232, storing a virtual address (VA); and a field 234, storing a physical address (PA). In another exemplary embodiment, the process context identifier PCID and the virtual processor identifier VPID in a TLB entry structure each occupy one field. For a TLB entry, the key ID of the corresponding system memory space is directly recorded in the field 224 to be compared with the designated key ID (Key_ID_S) 134 to determine whether the TLB entry matches the designated key ID (Key_ID_S) 134. The key ID is independent of the other information such as those recorded in the other fields. Thus, the space of the system memory 102 may be divided in a more flexible manner for individual encryption. An example is shown here. In a virtual machine VM0, a virtual processor with a VPID value VP0 executes a process whose PCID value is P0. The process P0 may use the system memory space with a virtual address VA0, and the virtual address VA0 is mapped to a key ID KEYID0. Referring to table 3, a related TLB entry is shown. The valid bit 226 is '1', the field 228 (PCID/VPID) is P0/VP0, the field 230 (key ID) is KEYID0, the field 232 (virtual address) is VA0, and the field 234 (physical address) is PA0. The designated key ID (Key_ID_S) 134 is compared with the key ID KEYID0. If they are the same, the TLB entry matches the designated key ID (Key_ID_S) 134. Otherwise, it does not match.

TABLE 3

| Valid bit 226 | PCID/VPID 228 | Key ID 230 | VA 232 | PA 234 |
|---|---|---|---|---|
| 1 | P0/VP0 | KEYID0 | VA0 | PA0 |

Figure 2D:
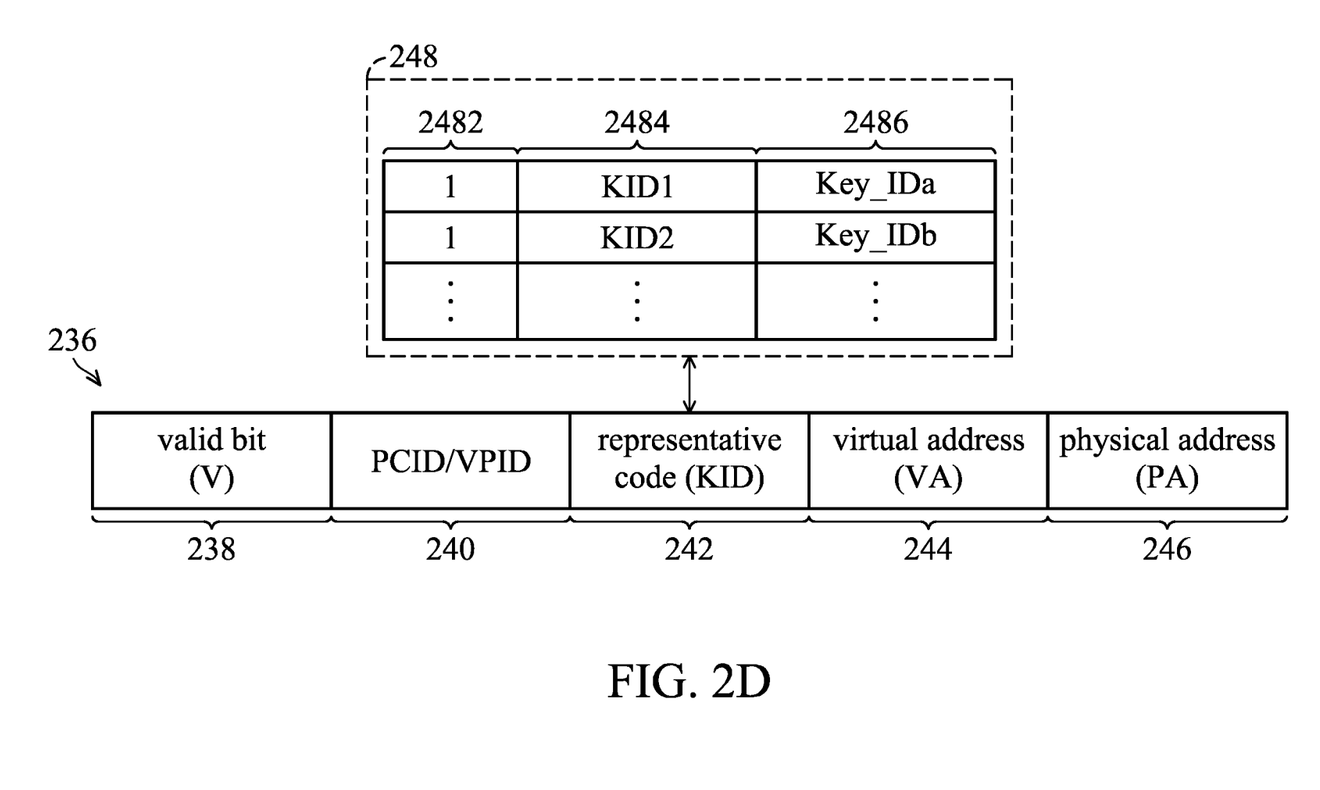

FIG. 2D illustrates a TLB entry structure 236, including: a valid bit (V) 238 for identifying whether the TLB entry is valid (e.g., '0' means that the TLB entry is invalid, and '1' means that the TLB entry is valid); a field 240, storing a process context identifier PCID and/or a virtual processor identifier VPID; a field 242, storing a representative code KID; a field 244, storing a virtual address (VA); and a field 246, storing a physical address (PA). The bit length of the representative code (KID) is shorter than the bit length of the designated key ID (Key_ID_S), so the size of each TLB entry may be reduced, the storage space of the whole TLB table 118 can be saved, and the complexity of hardware matching logic may be reduced. In an exemplary embodiment, the representative code (KID) is a one-hot code (only one bit is 1). For example, 0001, or 0010, or 0100, or 1000 represent four different key IDs. Using one-hot codes makes hardware implementation simpler and may improve the efficiency of hardware matching logic. In another exemplary embodiment, the process context identifier PCID and the virtual processor identifier VPID in a TLB entry structure each occupy one field. The representative code KID stored in the field 242 of the TLB entry structure 234 is compared with a representative code that representing the designated key ID (Key_ID_S) 134, to determine whether the TLB entry matches the designated key ID (Key_ID_S) 134. Instead of recording a key ID, the TLB entry storing a representative code KID requires less storage space. In addition, the efficiency of the hardware matching logic in the TLB 117 is improved.

FIG. 2D further shows a mapping table 248, that includes a plurality of entries, and each entry includes a valid bit field 2482, a representative code field 2484, and a key ID field 2486, storing a valid flag (V), a representative code KID, and a key ID, respectively. The valid bit field 2482 storing a valid flag (V) shows that whether the corresponding entry is valid. If the valid flag (V) is 0, it means that the corresponding entry is free (that is, invalid). If the valid flag (V) is 1, it means that the corresponding entry is in use (that is, valid). The representative code field 2484 stores a representative code. In an exemplary embodiment, the processor 100 only maintains a fixed amount of representative codes. Each entry in the mapping table 248 corresponds to one representative code (KID). For example, the entry 1 in the mapping table 248 is related to a representative code KID1, the entry 2 in the mapping table 248 is related to a representative code KID2, and so on. In an exemplary embodiment, the processor 100 maintains only eight representative codes. In each entry, the key ID field stores the key ID mapped to the representative code of the corresponding entry. A newly appeared key ID is mapped to one free representative code (KID), and is recorded into an entry in mapping table 248 that is related to the mapped representative code (KID). For example, as shown in FIG. 2D, the newly filled two entries in the mapping table 248 show the mapping relationship between a key ID Key_IDa and a representative code KID1, and the mapping relationship between a key ID Key_IDb and a representative code KID2. The valid flags of the two entries storing the representative codes KID1 and KID2 both are asserted to 1. A designated representative code 140 is obtained by looking it up in the mapping table 248 based on the designated key ID (Key_ID_S). Then, the TLB table 118 is checked to find and flush a TLB entry that matches the designated representative code 140. The management (including filling, updating, flushing, and matching search) of the mapping table 248 may be implemented by a control logic circuit of the TLB 117.

Corresponding to the TLB entry structure 236, an example about checking the matched TLB entries is discussed in this paragraph. In a virtual machine VM0, a virtual processor with a VPID value VP0 executes a process whose PCID value is P0. The process P0 may use the system memory space with a virtual address VA0, the virtual address VA0 is mapped to a physical address PA0, and the key ID corresponding to the process P0 is KEY_IDa.

Referring to table 4, a related TLB entry is shown. The valid bit 238 is '1', the field 240 (PCID/VPID) is P0/VP0, the field 242 (KID) is KID1, the field 244 (virtual address) is VA0, and the field 246 (physical address) is PA0. The control logic circuit of the TLB 117 first looks up the designated key ID (Key_ID_S) 134 in the mapping table 248 to get the designated representative code 140 (e.g., KID1 or KID2), and then compares the designated representative code 140 with the representative code KID1 recorded in the field 242. If they are the same, the TLB entry matches the designated key ID (Key_ID_S) 134. Otherwise, it does not match. If the control logic circuit of the TLB 117 determines that no representative code 140 in the mapping table 248 matches the designated key ID (Key_ID_S), it means that the TLB table 118 does not have any TLB entry matching the designated key ID (Key_ID_S).

TABLE 4

| Valid bit 238 | PCID/VPID 240 | KID 242 | VA 244 | PA 246 |
|---|---|---|---|---|
| 1 | P0/VP0 | KID1 | VA0 | PA0 |

Figure 3A:
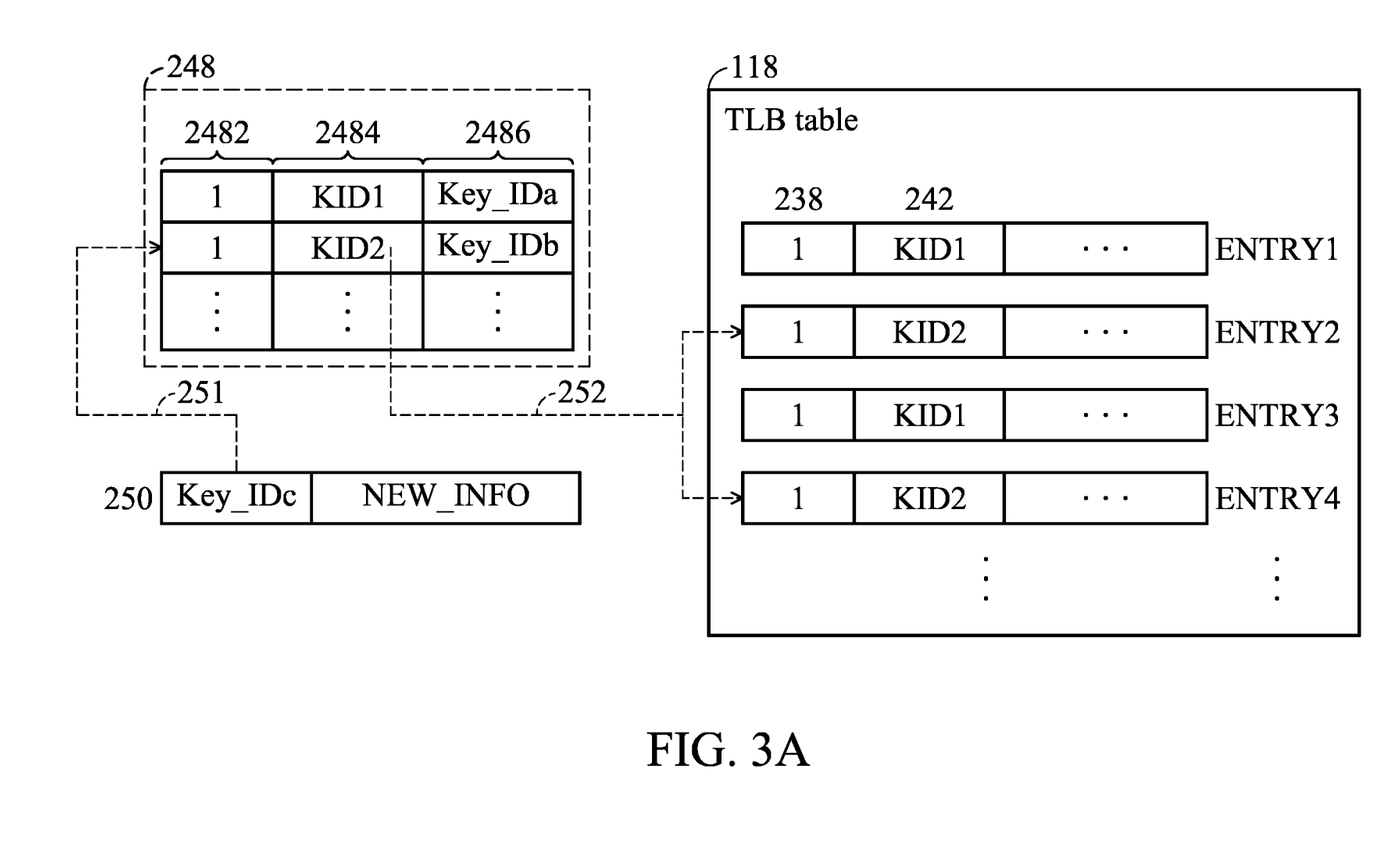
FIGS. 3A to 3C show how to fill the TLB entries (referring to the structure of FIG. 2D) of the TLB table 118 when the mapping table 248 is full.
Figure 3B:
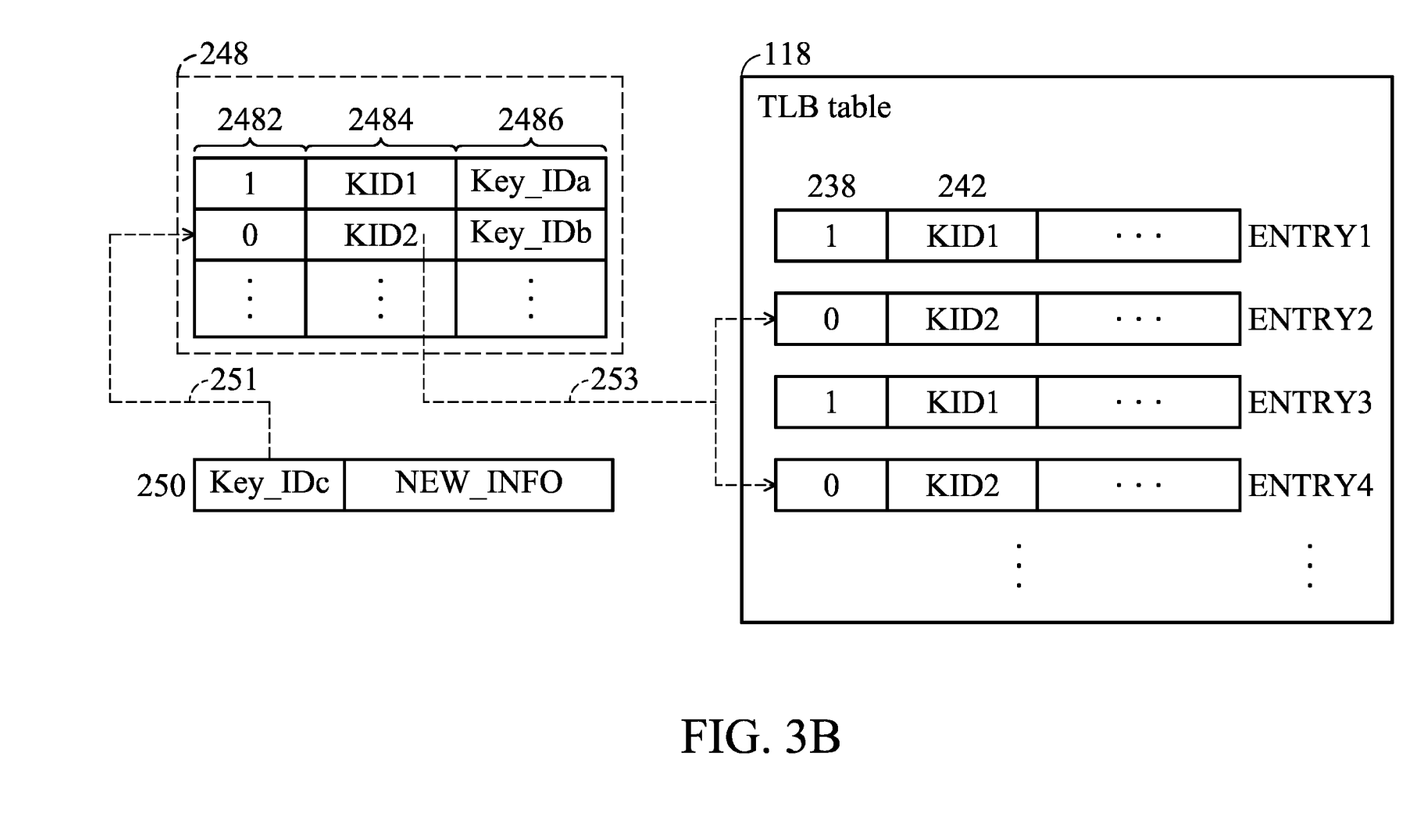
Figure 3C:
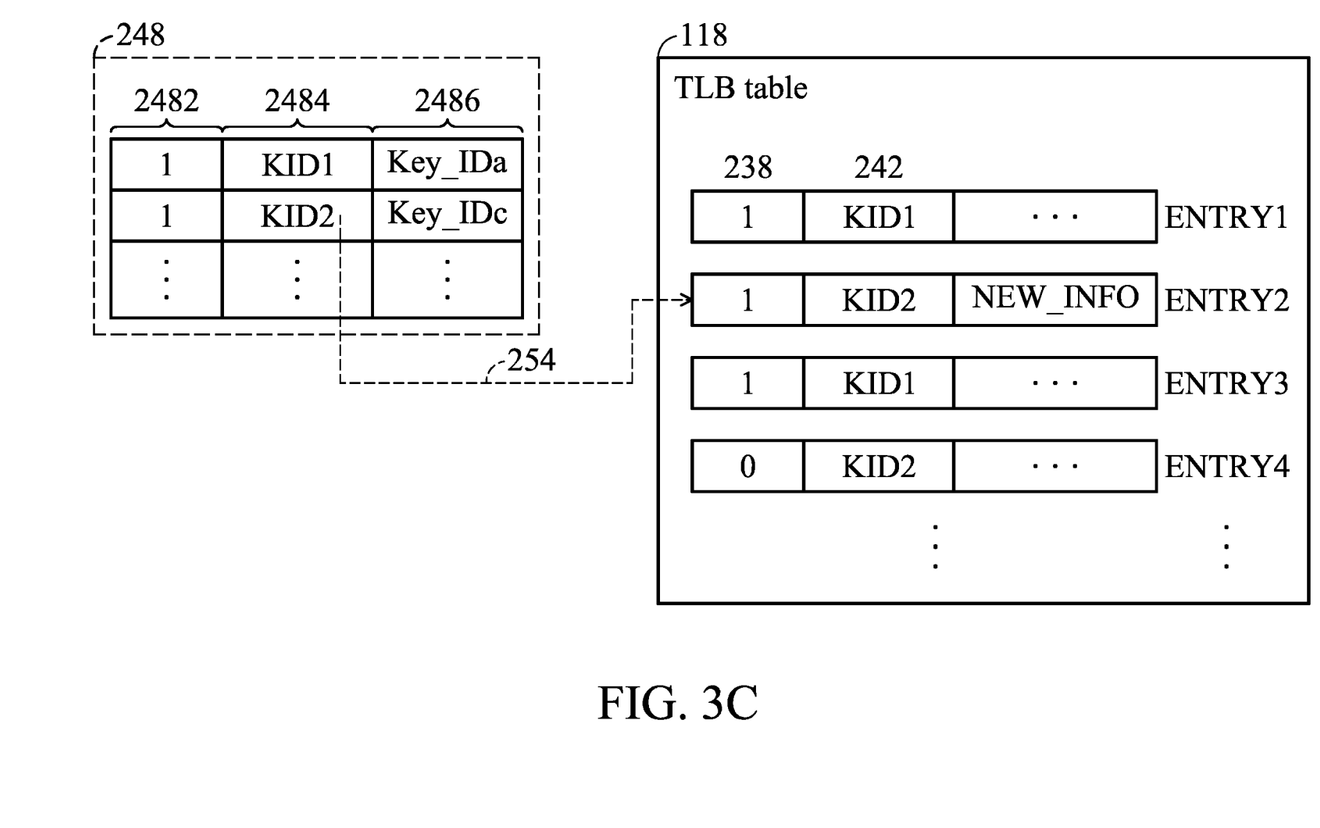

With an example shown in FIGS. 3A to 3C, the following describes how to fill a TLB entry in the TLB table 118 according to the TLB entry structure shown in FIG. 2D when the mapping table 248 is full. Referring to FIG. 3A, a mapping table 248 the same as that presented in FIG. 2D is shown. FIG. 3A further shows a TLB table 118 that includes several TLB entries ENTRY1, ENTRY2, ENTRY3, ENTRY4, and so on. The TLB entries ENTRY2 and ENTRY4 match a representative code KID2, and correspond to an entry in the mapping table 248 as indicated by the arrow 252. When new data 250 (including an key ID Key_IDc and TLB entry information NEW_INFO) has to be loaded to the TLB 118, but the mapping table 248 is full (all valid flags are asserted to 1), the following steps are required.

First, the control logic circuit of the TLB 117 selects the least frequently used (LFU) entry in the mapping table 248 (which is the entry indicated by the arrow 251 and corresponds to the representative code KID2) to pair the key ID Key_IDc with the representative code KID2. In another exemplary, the control logic circuit of the TLB 117 selects the least recently used (LRU) entry in the mapping table 248 rather than the least frequently used (LFU) entry in the mapping table 248.

Then, please refer to FIG. 3B, the control logic circuit of the TLB 117 invalidates the entries ENTRY2 and ENTRY4 in the TLB table 118, wherein, as indicated by an arrow 253, the entries ENTRY2 and ENTRY4 match the representative code KID2. The control logic circuit of the TLB 117 further invalidates the entry, related to the representative code KID2, in the mapping table 248. Specifically, the control logic circuit of the TLB 117 deasserts the valid bits 238 of the entries ENTRY2 and ENTRY4 (which match the representative code KID2) to 0, and deasserts the valid bit 2482 of the entry (matching the representative code KID2) in the mapping table 248 to 0.

Finally, please refer to FIG. 3C, the control logic circuit of the TLB 117 writes the key ID Key_IDc into the key ID field 2486 of the entry that is related to the representative code KID2 in the mapping table 248. The control logic circuit of the TLB 117 further writes the new TLB entry information NEW_INFO into the TLB entry ENTRY2, asserts the valid bit 238 of the entry ENTRY2 to 1, and programs the representative code KID2 to the field 242 of the entry ENTRY2 (as indicated by the arrow 254), and asserts the valid bit 2482 of the entry related to the representative code KID2 in the mapping table 248 to 1.

Figure 4:
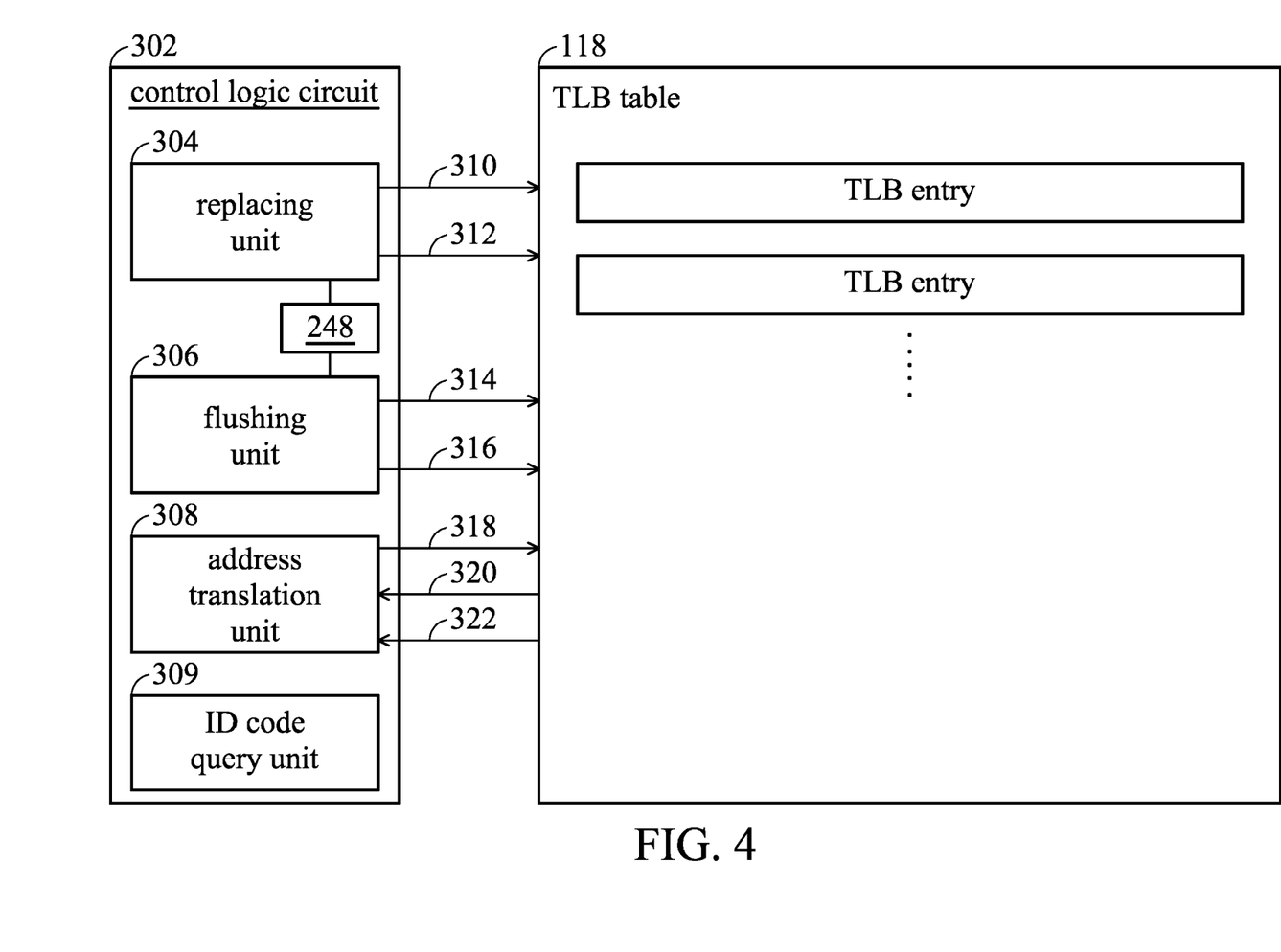
FIG. 4 is a block diagram illustrating a control logic circuit 302 of the TLB 117 in accordance with an exemplary embodiment of the present application.

FIG. 4 is a block diagram illustrating a control logic circuit 302 of the TLB 117 in accordance with an exemplary embodiment of the present application. The control logic circuit 302 includes a replacing unit 304, a flushing unit 306, and an address translation unit 308. The replacing unit 304 is responsible for filling in the TLB entries. Specifically, the MOB 116 (shown in FIG. 1B) provides a replacing request, an index number of the target TLB entry, and the filling content to the replacing unit 304. Accordingly, the replacing unit 304 outputs a replacing command, the index number 310 of the target TLB entry, and the filling content 312 to the TLB table 118. The replacing unit 304 may update the mapping table 248 and the TLB table 118 as previously described. The flushing unit 306 may execute the functions of the flushing unit 120 shown in FIG. 1B, which is used for flushing the TLB table 118 based on the designated matching information, and may also be compatible with the other conventional flushing techniques of the other granularities. According to the flushing microinstruction translated from the instruction INVL_KEYID, the MOB 116 operates to drive the flushing unit 306. The signals that the flushing unit 306 provides to the TLB table 118 include mapping information 314, and the flushing command 316. According to the flushing command 316, the TLB flushing is not limited to full TLB flushing, and may be performed in granularity of key ID, PCID, VPID, or EPTP. The matching information 314 indicates the designated flushing range that is defined based on the applied flushing granularity.

The address translation unit 308 is driven by the MOB 116 use the TLB table 118 to convert a virtual address (VA) 318 into a physical address (PA) 322. Specifically, according to the virtual address (VA) 318 provided from the translation unit 308, the TLB table 118 returns a flag 320 to the address translation unit 308 that indicates whether there are any TLB-entry hits. If yes, the TLB table 118 provides the hit physical address (PA) 322 to the address translation unit 308. In an exemplary embodiment, the MOB 116 provides both the key ID (not shown) and the virtual address (VA) 318 to the address translation unit 308 to convert the virtual address (VA) 318 that matches the key ID to the physical address (PA) 322.

In summary, the control logic circuit 302 implements the filling, replacing, and multi-granularity flushing of the TLB table 118.

The present application is not limited to using a single operand to get the designated key ID (Key_ID_S). The instruction INVL_KEYID may be performed based on more parameters (entered through multiple operands), which will be described in detail below with reference to FIG. 5.

Figure 5:
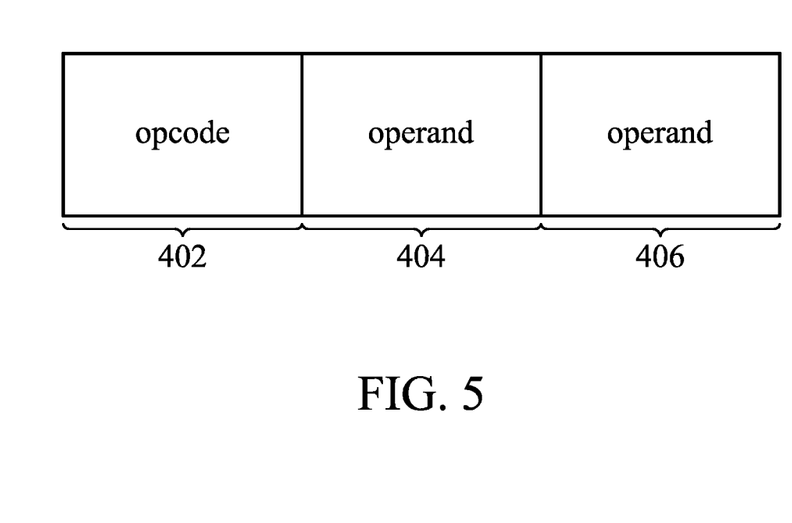
FIG. 5 is an instruction format of the instruction INVL_KEYID.

FIG. 5 is an instruction format of the instruction INVL_KEYID. In addition to the opcode 402 for recognizing the instruction INVL_KEYID, there are two operands 404 and 406 for getting two parameters. The two operands 404 and 406 may be entered through two registers. In another exemplary embodiment, the two operands 404 and 406 are separately stored in a register and a memory. In programming, there are other instructions executed prior to the instruction INVL_KEYID to prepare these operands 404 and 406.

In an exemplary embodiment, the operand 404 is a type indicator that indicates how to interpret the operand 406. The processor 100 shown in FIG. 1B may use a prefetch instruction (PREFETCH) to load the required data into the cache. The prefetch instruction carries information about the type indicator, the value of which may be T0 (indicating the first type) or T1 (indicating the second type). The operand 404 refers to the type indicator carried in the prefetch instruction. When the operand 404 is a first value (such as T0), the operand 406 is interpreted as a virtual address (VA), and the control logic circuit 302 shown in FIG. 4 uses the key ID corresponding to the VA as the designated key ID (Key_ID_S). In an exemplary embodiment, the control logic circuit 302 further includes an ID code query unit 309. The microinstructions translated from the instruction INVL_KEYID include a query microinstruction. According to the query microinstruction, the MOB 116 operates to drive the ID code query unit 309 to consult the TLB table 118 for a key ID of the virtual address (VA) indicated in an operand of the query microinstruction. For example, if the TLB entry in FIG. 4 is in the structure depicted in FIG. 2A, the queried key ID is the value in the field 208 of the TLB entry that matches the virtual address (VA). If the TLB entry in FIG. 4 is in the structure depicted in FIG. 2B, the queried key ID is the value in the field 218 of the TLB entry that matches the virtual address (VA). If the TLB entry in FIG. 4 is in the structure shown in FIG. 2C, the queried key ID is the value in the field 230 of the TLB entry that matches the virtual address (VA). If the TLB entry in FIG. 4 is in the structure shown in FIG. 0.2D, according to a representative code (KID) in the field 242 of the TLB entry that matches the virtual address (VA), a key ID that is paired with the representative code (KID) in the mapping table 248 is output as the queried key ID. When the operand 404 is a second value (such as T1), the operand 406 is directly interpreted as the designated key ID (Key_ID_S).

According to the designated key ID (Key_ID_S), the microinstructions decoded from the instruction INVL_KEYID can provide various flushing schemes considering the system conditions. For example, by executing the microinstructions, it is determined whether a virtual machine extension (VMX) is enabled or disabled, and what state the virtual machine with the enabled virtual machine extension is in. Based on the determination result, the microinstructions are executed to flush the TLB based on the designated key ID (Key_ID_S). If the virtual machine extension is not enabled (VMX off), or the virtual machine with the enabled virtual machine extension is in a host state, the TLB is flushed according to the designated key ID (Key_ID_S) without considering the virtual processor identifier VPID and the process context identifier PCID. If the virtual machine with the enabled virtual machine extension is in a guest state and the virtual processor identifier VPID is off, all TLB entries related to any virtual machine in the TLB are flushed based on the designated key ID (Key_ID_S) without considering the process context identifier PCID. As for the other situations, all TLB entries related to the current virtual processor identifier VPID in the TLB are flushed according to the designated key ID (Key_ID_S).

Any technology that flushes a TLB in granularity of key ID is within the scope of protection in this case.

According to the technology of the present application, the translation lookaside buffer (TLB) is provided with a management function in granularity of keys. When a full memory encryption function is enabled, the operating system can manage the translation lookaside buffer (TLB) in granularity of keys (or key IDs).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A processor with a translation lookaside buffer flushing capability performed based on a designated key identification code, comprising:
   a memory order buffer, configured to be a communication interface between the processor and a system memory;
   a translation lookaside buffer, having a plurality of entries cached therein, to be searched by the processor to access the system memory; and
   a decoder, in response to an instruction that is in an instruction set architecture and provided to flush the translation lookaside buffer based on the designated key identification code, decoding the instruction to provide at least one microinstruction;
   wherein:
   the at least one microinstruction includes a flushing microinstruction;
   by executing the flushing microinstruction:
      the designated key identification code is provided to a control logic circuit of the translation lookaside buffer through the memory order buffer; and
      the control logic circuit flushes matched entries in the translation lookaside buffer, wherein the matched entries match the designated key identification code.

2. The processor as claimed in claim 1, wherein each entry in the translation lookaside buffer stores matching information for determining whether the entry matches the designated key identification code.

3. The processor as claimed in claim 2, wherein each entry in the translation lookaside buffer stores a physical address formed by high-order bits and low-order bits, and the high-order bits shows a key identification code corresponding to the physical address and is interpreted as the matching information stored in the entry.

4. The processor as claimed in claim 2, wherein each entry in the translation lookaside buffer stores a process context identifier which is used as a key identification code and is interpreted as the matching information stored in the entry.

5. The processor as claimed in claim 2, wherein each entry in the translation lookaside buffer stores a virtual processor identifier which is used as a key identification code and is interpreted as the matching information stored in the entry.

6. The processor as claimed in claim 2, wherein each entry in the translation lookaside buffer stores a physical address and a key identification code, and the key identification code is interpreted as the matching information stored in the entry.

7. The processor as claimed in claim 2, wherein each entry in the translation lookaside buffer stores a representative code that represents a key identification code and is interpreted as the matching information stored in the entry, and a bit length of the representative code is shorter than a bit length of the key identification code.

8. The processor as claimed in claim 7, wherein:
   the control logic circuit includes a replacing unit and, when filling each entry in the translation lookaside buffer, the replacing unit pairs one key identification code with one representative code for the filling entry, to form a mapping table between representative codes and key identification codes;
   the control logic circuit further includes a flushing unit that is operated according to the flushing microinstruction to look up the mapping table based on the designated key identification code, to obtain a designated code; and
command to the translation lookaside buffer to flush entries matching the designated representative code.

9. The processor as claimed in claim 1, wherein:
the control logic circuit includes a flushing unit that receives the flushing microinstruction and the designated key identification code to output a flushing command and designated matching information to the translation lookaside buffer, wherein the designated matching information is associated with the designated key identification code.

10. The processor as claimed in claim 1, wherein:
the instruction contains opcode for recognition;
the instruction has a first operand and a second operand, which are stored in registers of the processor, or separately stored in a register of the processor and a system memory;
when the first operand is a first value, the second operand is interpreted as a virtual address, and the at least one microinstruction is executed to obtain the designated key identification code by accessing the system memory according to the virtual address; and
when the first operand is a second value, the second operand is interpreted as the designated key identification code.

11. The processor as claimed in claim 1, wherein:
according to the at least one microinstruction, the processor determines whether a virtual machine extension is enabled or disabled, and a state that a virtual machine with the enabled virtual machine extension is in, and, according to the determination, the processor flushes the translation lookaside buffer based on the designated key identification code.

12. The processor as claimed in claim 11, wherein:
in response to determining that the virtual machine extension is disabled, or in response to determining that the virtual machine with the enabled virtual machine extension is in a host state, the processor flushes the translation lookaside buffer based on the designated key identification code without considering a virtual processor identifier and a process context identifier.

13. The processor as claimed in claim 11, wherein:
in response to determining that the virtual machine with the enabled virtual machine extension is in a virtual machine state without using a virtual processor identifier, the processor flushes entries, related to any virtual machines, of the translation lookaside buffer based on the designated key identification code, without considering a process context identifier.

14. The processor as claimed in claim 11, wherein:
when neither a first condition nor a second condition are satisfied, the processor flushes all entries, related to a current virtual processor identifier, of the translation lookaside buffer based on the designated key identification code;
in the first condition, the virtual machine extension is disabled, or the virtual machine with the enabled virtual machine extension is in a host state; and
in the second condition, the virtual machine with the enabled virtual machine extension is in a virtual machine state without using the virtual processor identifier.

15. A method for flushing a translation lookaside buffer based on a designated key identification code, comprising:
in response to an instruction that is in an instruction set architecture and provided to flush the translation lookaside buffer based on the designated key identification code, decoding the instruction to provide at least one microinstruction, wherein the at least one microinstruction includes a flushing microinstruction; and
by executing the flushing microinstruction, the designated key identification code is provided to a control logic circuit of the translation lookaside buffer through a memory order buffer, to operate the control logic circuit to flush matched entries in the translation lookaside buffer, wherein the matched entries match the designated key identification code.

16. The method as claimed in claim 15, further comprising:
storing matching information in each entry in the translation lookaside buffer for determining whether the entry matches the designated key identification code.

17. The method as claimed in claim 16, wherein each entry in the translation lookaside buffer stores a physical address formed by high-order bits and low-order bits, and the high-order bits shows a key identification code corresponding to the physical address and is interpreted as the matching information stored in the entry.

18. The method as claimed in claim 16, wherein each entry in the translation lookaside buffer stores a process context identifier which is used as a key identification code and is interpreted as the matching information stored in the entry.

19. The method as claimed in claim 16, wherein each entry in the translation lookaside buffer stores a virtual processor identifier which is used as a key identification code and is interpreted as the matching information stored in the entry.

20. The method as claimed in claim 16, wherein each entry in the translation lookaside buffer stores a physical address and a key identification code, and the key identification code is interpreted as the matching information stored in the entry.

21. The method as claimed in claim 16, wherein each entry in the translation lookaside buffer stores a representative code that represents a key identification code and is interpreted as the matching information stored in the entry, and a bit length of the representative code is shorter than a bit length of the key identification code.

22. The method as claimed in claim 21, further comprising:
when filling each entry in the translation lookaside buffer, pairing one key identification code with one representative code for the filling entry, to form a mapping table between representative codes and key identification codes;
according to the flushing microinstruction, searching the mapping table based on the designated key identification code, to obtain a designated representative code corresponding to the designated key identification code; and
providing the designated representative code and a flushing command to the translation lookaside buffer to flush entries matching the designated representative code.

23. The method as claimed in claim 15, wherein:
the instruction contains opcode for recognition;
the instruction has a first operand and a second operand;
when the first operand is a first value, the second operand is interpreted as a virtual address, and the at least one microinstruction is executed to obtain the designated key identification code by accessing the system memory according to the virtual address; and when the first operand is a second value, the second operand is interpreted as the designated key identification code.

24. The method as claimed in claim 15, further comprising:

according to the at least one microinstruction, determining whether a virtual machine extension is enabled or disabled, and a state that a virtual machine with the enabled virtual machine extension is in; and according to the determination, flushing the translation lookaside buffer based on the designated key identification code.

25. The method as claimed in claim 24, wherein:

in response to determining that the virtual machine extension is disabled, or in response to determining that the virtual machine with the enabled virtual machine extension is in a host state, the translation lookaside buffer is flushed based on the designated key identification code without considering a virtual processor identifier and a process context identifier.

26. The method as claimed in claim 24, wherein:

in response to determining that the virtual machine with the enabled virtual machine extension is in a virtual machine state without using a virtual processor identifier, entries, related to any virtual machines, of the translation lookaside buffer are flushed based on the designated key identification code, without considering a process context identifier.

27. The method as claimed in claim 24, wherein:

when neither a first condition nor a second condition are satisfied, all entries, related to a current virtual processor identifier, of the translation lookaside buffer are flushed based on the designated key identification code;

in the first condition, the virtual machine extension is disabled, or the virtual machine with the enabled virtual machine extension is in a host state; and in the second condition, the virtual machine with the enabled virtual machine extension is in a virtual machine state without using the virtual processor identifier.

* * * * *